(12) United States Patent
Orcutt

(10) Patent No.: US 8,094,352 B2
(45) Date of Patent: Jan. 10, 2012

(54) MIRROR ASSEMBLY WITH RECESSED MIRROR

(75) Inventor: John W. Orcutt, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 595 days.

(21) Appl. No.: 12/120,028

(22) Filed: May 13, 2008

(65) Prior Publication Data

US 2009/0284817 A1  Nov. 19, 2009

(51) Int. Cl.
*G02B 26/08* (2006.01)

(52) U.S. Cl. .................. 359/199.3; 359/213.1

(58) Field of Classification Search .... 359/199.1–199.4, 359/200.7, 213.1, 220.1, 221.1, 224.1, 224.2
See application file for complete search history.

(56) References Cited

U.S. PATENT DOCUMENTS

| 6,820,988 | B2 | 11/2004 | van Drieënhuizen et al. |
| 6,956,684 | B2 * | 10/2005 | Orcutt ........................ 359/199.1 |
| 6,999,215 | B2 * | 2/2006 | Dewa et al. ................ 359/198.1 |
| 7,050,211 | B2 * | 5/2006 | Orcutt ........................ 359/224.1 |
| 7,443,569 | B2 * | 10/2008 | Mala et al. ..................... 359/290 |
| 7,529,011 | B2 * | 5/2009 | Fujii ........................... 359/224.1 |
| 2005/0157363 | A1 * | 7/2005 | Orcutt ........................... 359/224 |
| 2007/0058238 | A1 * | 3/2007 | Mala et al. ..................... 359/291 |

* cited by examiner

*Primary Examiner* — Frank Font
(74) *Attorney, Agent, or Firm* — Warren L. Franz; Wade J. Brady, III; Frederick J. Telecky, Jr.

(57) ABSTRACT

A mirror device and a method for manufacturing the mirror device are presented. The mirror device includes a mirror formed from a first substrate and a hinge/support structure formed from a second substrate. The hinge/support structure includes a recessed region and a torsional hinge region. The mirror is coupled to the hinge/support structure at the recessed region. Further, a driver system is employed to cause the mirror to pivot about the torsional hinge region.

10 Claims, 6 Drawing Sheets

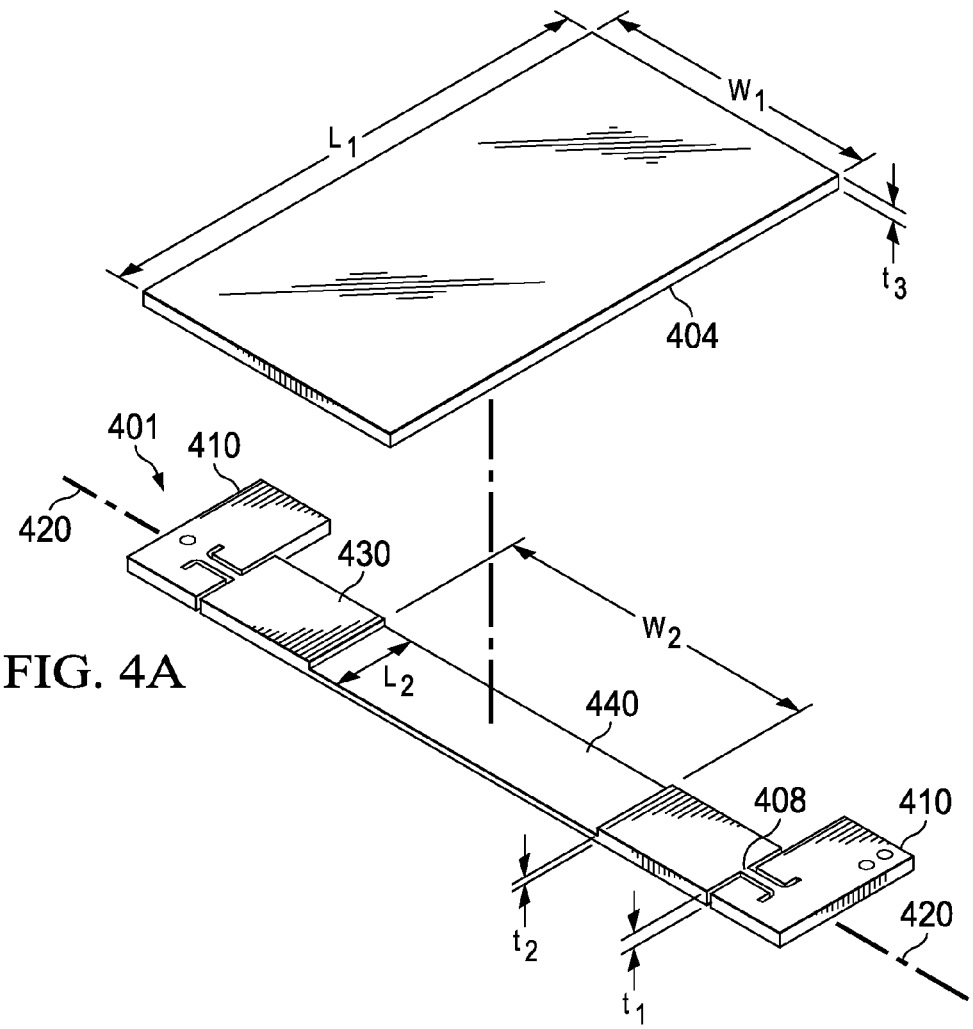
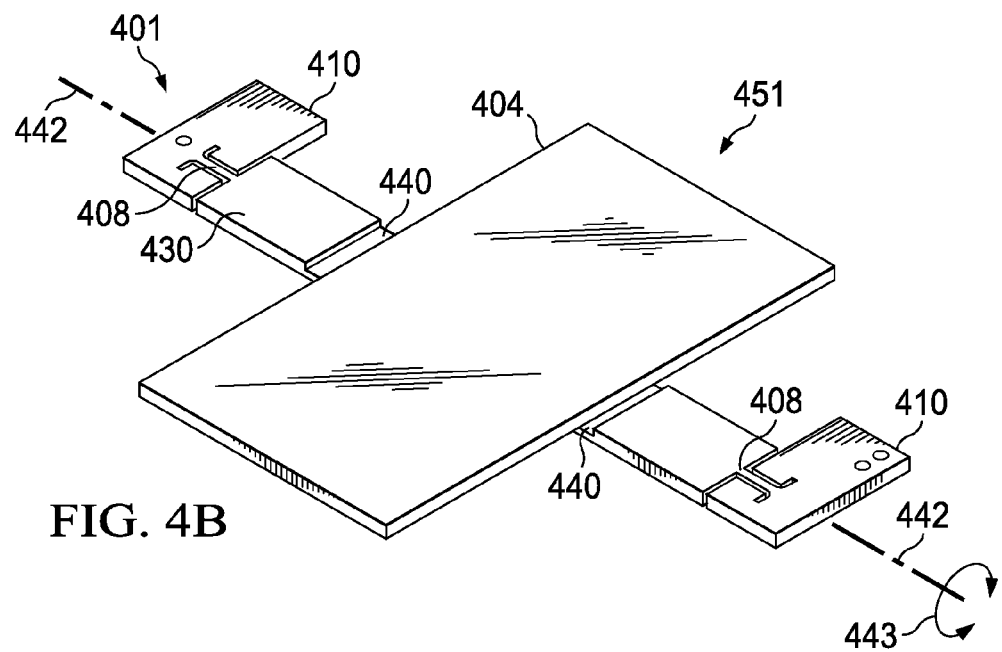

MIRROR ASSEMBLY WITH RECESSED MIRROR

TECHNICAL FIELD

The present invention relates generally to MEMS (microelectromechanical systems) devices and more specifically to a MEMS structure and a method of manufacturing a MEMS mirror assembly with a recessed mirror.

BACKGROUND

Micro-mechanical devices or micro-electromechanical systems (MEMS) are micron-scale devices, often with moving parts, that may be fabricated using traditional semiconductor processes such as optical lithography, metal sputtering, oxide deposition, and plasma etching, which have been developed for the fabrication of integrated circuits.

Micromirrors, such as the DLP™ micromirror array from Texas Instruments, are a type of micro-mechanical device. Other types of micro-mechanical devices include accelerometers, pressure and flow sensors, gears, and motors. Pivoting or oscillating torsional hinged mirrors provide very effective and inexpensive replacements for spinning polygon shaped mirrors in printers and some types of displays. Further, other torsional hinged mirrors act as position indicators or pointer mirrors. Many of these MEMS devices have found wide commercial success.

Torsional hinged mirrors may be mirrors etched from a silicon substrate using processes similar to those used in the manufacture of semiconductor devices. The mirror and hinge structure may be processed out of a substrate comprised of a single silicon crystal, for example. However, manufacturing MEMS mirrors and hinge structures from one substrate may limit the mirror to the same thickness as the hinge. A thicker mirror may dictate a lower resonant frequency mirror. Therefore, mirror control may not be optimized for an application. New structures and methods for forming torsional hinge mirrors are thus needed to solve the above discussed problems.

SUMMARY OF THE INVENTION

These and other problems are generally solved or circumvented, and technical advantages are generally achieved by a mirror formed from one substrate and a hinge/support structure formed from another substrate.

In one aspect of an illustrative embodiment, a MEMS device is presented. The MEMS device includes a mirror formed from a first substrate and a hinge/support structure formed from a second substrate. The hinge/support structure includes a recessed region, and a torsional hinge region. The mirror is coupled to the hinge/support structure at the recessed region.

Advantages of preferred embodiments of the present invention include providing a low cost method of manufacturing a mirror assembly. A further advantage is that a mirror thinner than the hinge/support structure may be used, allowing thicker torsional hinge regions for a relatively thinner mirror. The combined structure may allow a higher resonant frequency. A mirror with a higher resonant frequency may enable better mirror control and quicker mirror reaction time.

The foregoing has outlined rather broadly the features and technical advantages of an illustrative embodiment in order that the detailed description of the invention that follows may be better understood. Additional features and advantages of an illustrative embodiment will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the illustrative embodiments as set forth in the appended claims.

BRIEF DESCRIPTION OF THE DRAWINGS

For a more complete understanding of the illustrative embodiments, and the advantages thereof, reference is now made to the following descriptions taken in conjunction with the accompanying drawings, in which:

FIGS. 4A-4D are drawings depicting aspects of a MEMS structure according to the illustrative embodiments.

The figures are drawn to clearly illustrate the relevant aspects of the preferred embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that an illustrative embodiment provides many applicable inventive concepts that can be embodied in a wide variety of specific contexts. The specific embodiments discussed are merely illustrative of specific ways to make and use the invention, and do not limit the scope of the invention.

The present invention will be described with respect to illustrative embodiments in a specific context, namely a MEMS pointing mirror. A MEMS pointing mirror may be used in applications such as, for example, fiber optic technologies. The invention may also be applied, however, to other MEMS mirror devices and applications, including applications which require the MEMS mirror to operate at resonant frequencies.

Pointing mirrors may often be operated far from resonant frequency. Operation of a mirror at the resonant frequency of an oscillating mirror may cause increased amplitude and rapid phase changes that may make operating a pointing mirror at or near resonant frequency undesirable. Therefore, the thicker torsional hinge region relative to a wider thinner mirror, as well as the decreased cost of manufacture, may be beneficial for pointing mirror devices and methods of manufacture.

Figure 1:
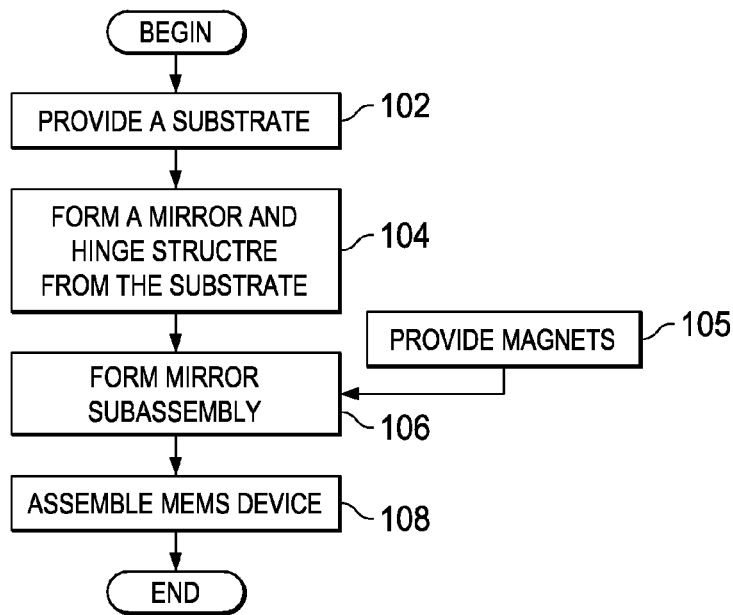
FIG. 1 is a selected portion of a known MEMS manufacturing process flow.

Referring now to FIG. 1, a selected portion of a known MEMS manufacturing process flow is shown. The process begins by providing a substrate (step 102). The substrate is patterned and etched, forming a mirror and hinge structure from the substrate (step 104). The etch performed may be a through-substrate etch, and may form an interconnected mirror and hinge piece from the single substrate provided. Magnets are provided (step 105). The magnets are coupled to the mirror and hinge structure forming a mirror subassembly (step 106). The mirror subassembly is assembled into a MEMS device (step 108).

Figure 2A:
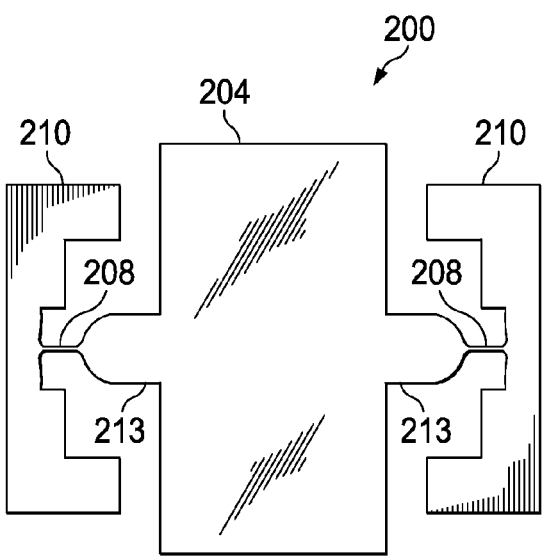
FIGS. 2A-2C are drawings depicting a prior art MEMS structure.
Figure 2B:
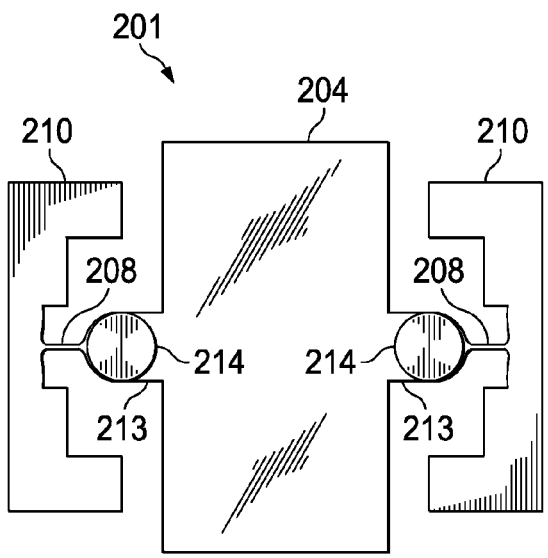
Figure 2C:
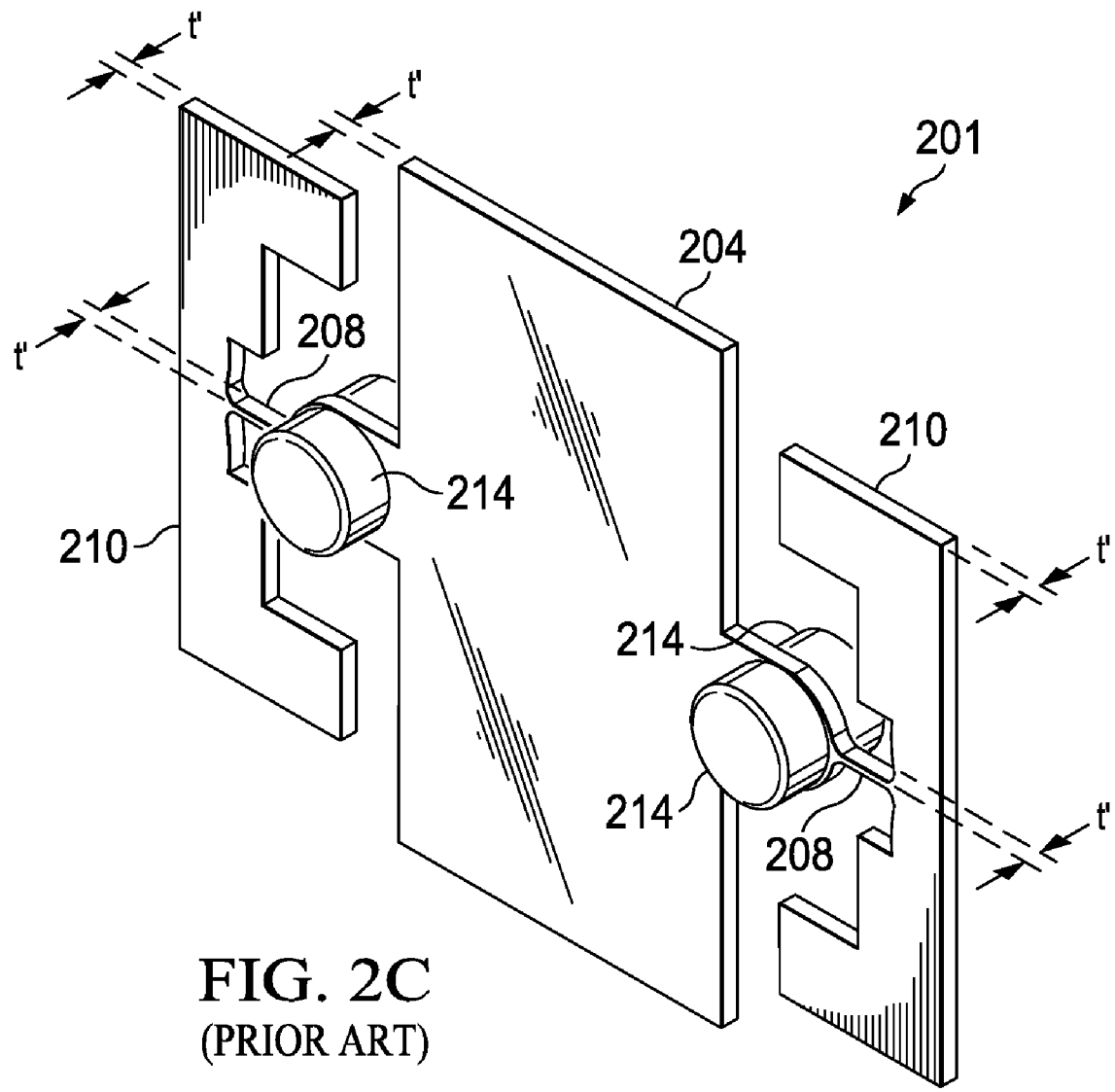

FIG. 2A-2C are drawings depicting select components of a prior art mirror and hinge structure. In FIG. 2A, a front view of mirror and hinge structure 200 includes mirror 204, drive magnet landings 213, torsional hinges 208, and hinge anchors 210. Mirror and hinge structure 200 is formed from a single piece of substantially planar material and the functional or moving parts may be etched in the planar sheet of material (such as silicon) by techniques similar to those used in semiconductor art. In another method of prior art, the mirror and hinge structure may be formed from the same substrate with the hinges formed under the mirror, thereby leaving the hinge unexposed from a front view of the mirror.

FIG. 2B shows prior art mirror subassembly 201. Mirror subassembly 201 includes a mirror and hinge structure, such as mirror and hinge structure 200, as shown in FIG. 2A, and drive magnets 214. FIG. 2C shows a perspective view of mirror subassembly 201. The perspective view illustrates that mirror 204, torsional hinges 208, and hinge anchors 210 are all of the same thickness t'. Magnet landings, such as magnet landings 213 in FIG. 2A, are also of the same thickness Drive magnets 214 may be comprised of two pairs of two magnets with drive magnets 214a-214d mounted on the front and back of the right and left sides of subassembly 201. Torsional hinges 208 are between hinge anchors 210 and magnet landings 213. A disadvantage of the prior art method is that mirror 204 may be constrained to the same thickness as torsional hinges 208, magnet landings 213, and/or hinge anchors 210, due to the simultaneous processing of mirror and hinge structure 200. The thickness constraint may affect performance. A further disadvantage of the prior art is the low number of mirrors produced per substrate, which may drive a higher cost of the prior art process.

Figure 3:
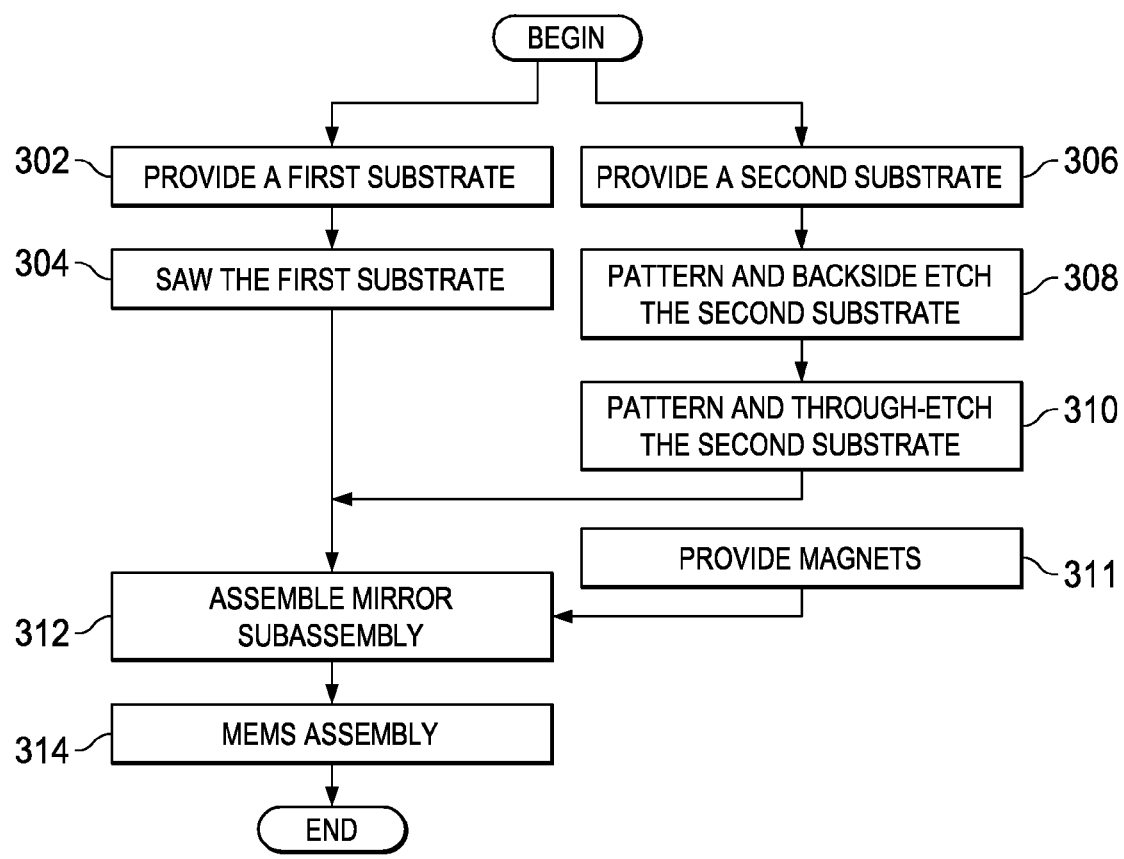
FIG. 3 is a process flow chart for MEMS manufacture according to an illustrative embodiment.

FIG. 3 is a process flow chart for a method of MEMS manufacture according to an illustrative embodiment. The method of MEMS manufacture begins with two processes on two substrates. The mirror process includes steps 302 and 304. The hinge/support structure process includes steps 306, 308, and 310. In addition, the method of MEMS manufacture includes mirror subassembly process (steps 311, 312) and ends with MEMS device assembly (step 314).

Returning to step 302, the mirror process begins with providing a first substrate. The first substrate may be comprised of a single material with a reflective surface such as silicon, or the like, or the first substrate may be a multilayered substrate with reflective coatings, layers or the like. The mirror may be, for example, about 100 microns in thickness, and may be polished on its upper surface to provide a specular or mirror surface. The thickness of the mirror may be determined by the requirement that the mirror remain flat during scanning. Further, the thickness of the mirror may be predetermined during a design phase based in part by the balance of the combined mirror/hinge/support structure. In order to achieve necessary flatness, the mirror may be formed with a radius of curvature greater than approximately 15 meters. The radius of curvature may be controlled by known stress control techniques such as by polishing one or both faces and employing deposition techniques for stress controlled thin films. If desired, a coating of suitable material may be placed on the mirror to enhance its reflectivity.

In a preferred embodiment, the mirror is formed by sawing the first substrate as in step 304. The saw process may be similar to a dicing process well known in the semiconductor processing arts. An advantage of an illustrated embodiment is the low cost of sawing processes. Mirrors may be rectangular, diamond, or other shapes within the scope of these embodiments. Mirrors may be about 16 times the mirror thickness in length and about 8 times the mirror thickness in width. An example mirror may be a rectangular shaped mirror with a long axis of about 8 millimeters, a short axis of about 4 millimeters, and a mirror thickness of about 0.5 millimeters. An embodiment with a rectangular shape may have a cost advantage in that the sawing process may produce more mirror structures from a single substrate. However, mirrors may have a length in a range of about 16 millimeters or less, and a width of between about 1-8 millimeters, for example.

Alternatively, in another embodiment, the first substrate may be patterned using photolithography techniques well known in the art of semiconductor processing. The first substrate may then be etched using a through-substrate process producing mirror structures.

Turning now to step 306, the hinge/support structure process begins by providing a second substrate. The second substrate may be any material that provides the strength and flexibility to withstand the oscillations of the mirror about the torsional hinge portion of the hinge/support structure, for example, single crystalline silicon or the like.

Turning to step 308, in an optional process, the recessed regions of the hinge/support structure are patterned on a back side of the second substrate. Recessing regions of the hinge/support structure offers advantages in mirror balancing, for example. Patterning of the backside of the second substrate may be accomplished by standard semiconductor processing techniques, such as photolithography, or the like, and is well known in the art. The backside of the second substrate is then etched in a recess-etch process (step 308). A recess etch is not a through-substrate etch and removes a portion of the backside of the second substrate.

The designed depth of the optional recess-etch may be determined, in part, based on the density of the materials used in the combined mirror/hinge/support structure (in other words, the density of the materials in both the first substrate and the second substrate), the thickness of the mirror, and the thickness of the hinge/support structure. If the densities of both substrates are substantially the same, for example if both substrates are silicon substrates, an approximation of the thickness of the recess region may be calculated as:

$$t_2 = (0.5t_1) - (0.5t_3);$$

wherein $t_1$ is the thickness of the torsional hinge portion of the hinge/support structure, in other words a non-recessed region of the hinge/support structure; $t_2$ is the thickness of the recessed region of the hinge/support structure; and $t_3$ is the thickness of the mirror. Therefore, the depth of the etch may be calculated by finding the difference between $t_1$ and $t_2$.

The recess-etch process may be a wet or dry etch and may be performed using techniques well known in semiconductor processing. Following the recess etch (step 308), the second substrate is patterned (step 310). In one embodiment the pattern and etch are done from the front side of the second substrate and then etched in a through-substrate process (step 310). Patterning and etching the recess regions on the backside of the second substrate (step 308) and patterning the front side of the second substrate for the hinge/support structure, is an advantage of an illustrative embodiment. In this case, the patterning of the hinge/support structure may be accomplished on the front side of the second substrate, unencumbered by the depth of focus issues caused by the recess etch.

Continuing with step 310, the second substrate is patterned with the hinge/support structure, which includes the torsional hinges, the recessed area, the magnet landings, and the hinge anchors. The through-substrate etch may be performed using a subclass of reactive ion etch (RIE) called a "Bosch" etch. In a Bosch etch, depths of hundreds of microns can be achieved with substantially vertical sidewalls. Two different gas compositions may be alternated in a reactor. The first gas composition creates a coating, for example, a polymer, a silicon oxide compound, or the like on the surface of the second substrate, and the second gas composition etches the second substrate. The polymer is sputtered away by the physical part of the etching, which impacts the horizontal surfaces primarily and not the sidewalls. Since the polymer dissolves very slowly in the chemical part of the etching, the polymer builds up on the sidewalls and protects the sidewalls from etching. As a result, etching aspect ratios of 50 to 1 may be achieved. The Bosch process may be used to etch completely through the second substrate. Etch rates for the Bosch etch may be 3-4 times higher than wet etching. However, wet etching or standard RIE etching is within the scope of the illustrative embodiments.

Turning now to step 312, the mirror subassembly is formed. The mirror formed from the first substrate and magnets, provided in step 311, are coupled, using die bonding processes, for example, to the hinge/support structure formed from the second substrate.

In step 314, the MEMS assembly process includes coupling the mirror subassembly to a driver mechanism, and a MEMS device encasement, such as a pre-molded package (step 314). Thus the process ends.

A drive mechanism applies torque to the mirror so that the mirror will pivot or rotate about the hinge/support structure on torsional hinges. The driver mechanism may use magnetic forces created by coils or windings located on a core proximate permanent magnets mounted on the combined mirror and hinge/support structure (mirror subassembly) to cause the mirror to pivot about the torsional hinge axis. The mirror subassembly includes a recessed mirror, torsional hinges, hinge anchors, and drive magnets. The MEMS device may further comprise a mirror stop, a package bracket, and terminals. The mirror stop prevents the mirror from over-pivoting about the torsional hinges. The terminals allow for power connections to the MEMS assembly.

Figure 4C:
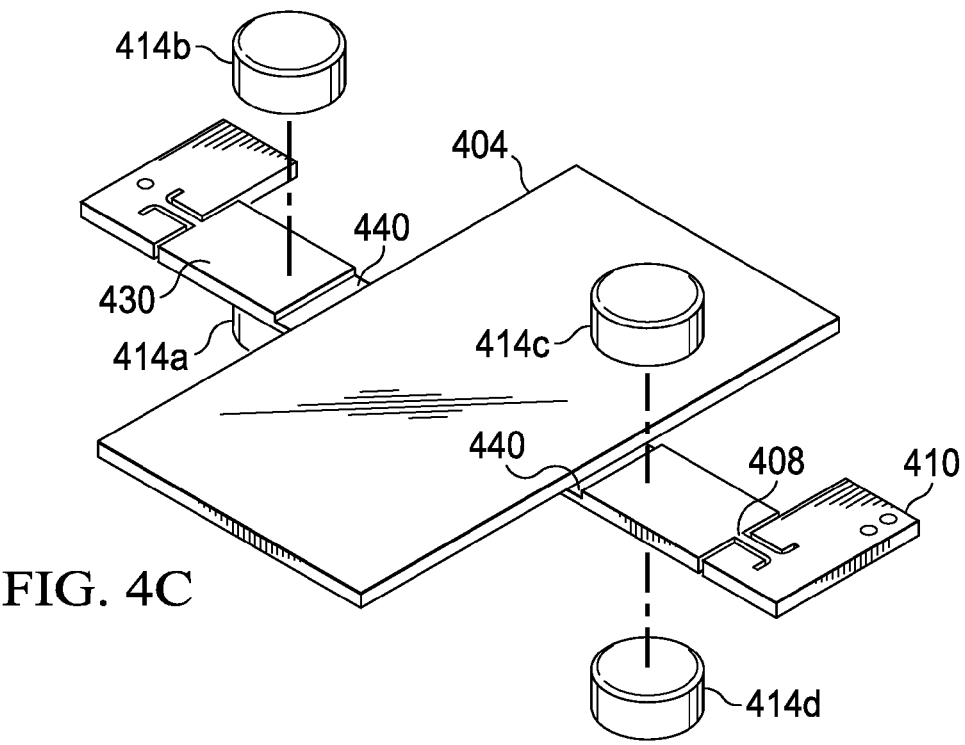

FIG. 4A-4D are drawings depicting aspects of a MEMS structure according to the illustrative embodiments. FIG. 4A shows the two portions of the mirror/hinge structure, according to an illustrative embodiment. Mirror 404 is not constrained to the thickness $t_1$ of hinge/support structure 401. Mirror 404 is shown to be width $W_1$, length $L_1$, and thickness $t_3$. However, as discussed above, mirror 404 may be any shape or dimension in accordance with an illustrative embodiment.

In an illustrative embodiment, hinge/support structure 401 is formed from a single crystalline silicon. Recessed region 440 of the hinge/support structure 401 is of a width "$W_2$," which is larger than the width "$W_1$" of mirror 404 ($W_2 > W_1$). Further, recessed portion 440 may be of a length $L_2$, wherein $L_1$ is greater than $L_2$.

Hinge/support structure 401 includes at least two thicknesses, $t_1$ and $t_2$. Torsional hinge thickness $t_1$, may be the thickness of hinge 408, mirror landings 430, and hinge anchors 410. The recess thickness $t_2$ is the thickness of recessed region 440, wherein $t_1 > t_2$. For example, $t_1$ may be in the range of about 80 to 200 microns and $t_2$ may be in the range of about 20 to 50 microns.

Turning to FIG. 4B, mirror/hinge/support structure 451 is depicted. Mirror 404 is coupled with hinge/support structure 401 at recessed region 440, forming mirror/hinge/support structure 451. The attachment of mirror 404 to hinge/support structure 401 may be accomplished using conventional attachment techniques such as, for example, adhesive bonding, indium bonding, and/or other types of adhesives or the like. In the embodiment shown, mirror 404 is placed centered on the hinge axis 442, which is the axis of rotation for hinge 408 and mirror 404. In other embodiments, mirror 404 may not be centered on hinge axis 442. The movement of mirror 404 is indicated by arcuate arrow 443. Mirror 404 may rotate on hinge axis 442 from fractions of a degree to about 35 degrees. Further, for a mirror hinge/support structure combination, wherein the first substrate and the second substrate are of about the same density, the relationship between the thicknesses may be $t_2 = \frac{1}{2}t_1 - \frac{1}{2}t_3$ to provide a system balanced about the axis of rotation 420 of the hinge/support structure. Features not discussed in this figure may be found in FIG. 4A and will not be further discussed here.

FIG. 4C shows magnets 414a-414d before the magnets are coupled to mirror landings 430. In the preferred embodiment, magnets 414a and 414b are mounted with north poles pointing down, and magnets 414c and 414d are mounted with north poles pointing up. However, there are several possible arrangements of the magnets, which may be used depending upon magnetic characteristics desired. Further, the number of magnets may be varied within the scope of these embodiments.

In the embodiment shown, a pair of magnets are placed with one magnet on the front side mirror landing 430, such as 414b and one magnet on the back side of mirror landing 430, such as 414a. In this example, both magnets 414b and 414a are oriented with north pole magnetic vectors pointing down. Magnet 414 pairs are placed on both sides of mirror 404. In this example, both magnets 414c and 414d are oriented with north pole magnetic vectors pointing up.

Figure 4D:
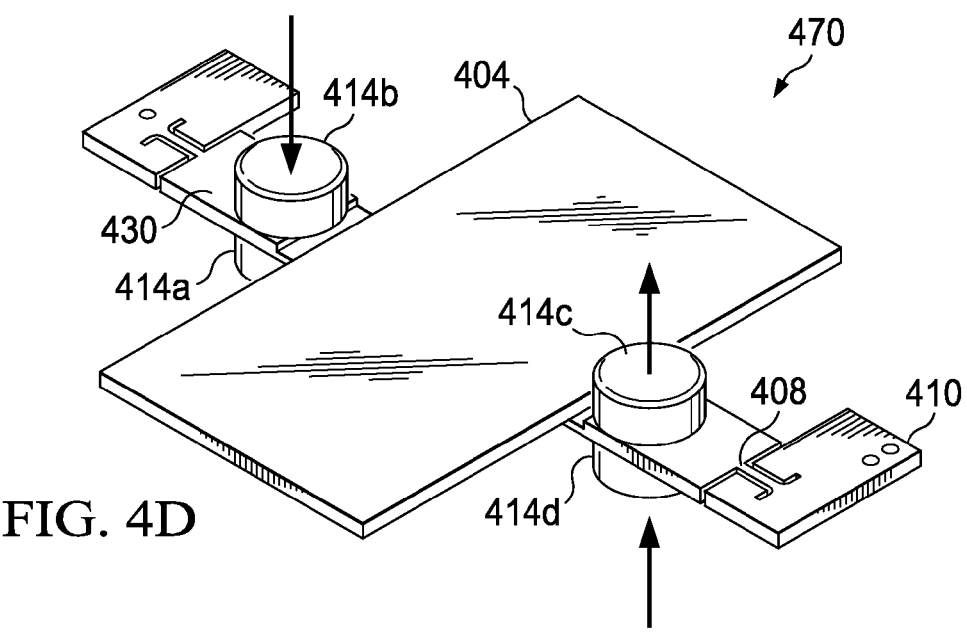

FIG. 4D shows magnets 414A-414D coupled to mirror landings 430 within a mirror subassembly 470. Magnets 414 are attached to magnet landings 430 to facilitate the electromagnetic drive of the MEMS device. Magnets 414 preferably comprise an upper magnet set mounted on the top surface of the mirror subassembly 470 using conventional attachment techniques such as adhesive bonding or indium bonding and an aligned lower magnet similarly attached to the lower surface of the mirror subassembly 470 as shown. Magnets may be placed to be in balance with the mirror/hinge/support structure, or magnets may be placed to balance the mirror subassembly structure. In the embodiment shown, magnets 414C and 414D are placed wherein the magnetic vectors of each magnet has the north pole oriented up. The volume of a magnet or magnets may be altered to bring the mirror subassembly into balance.

Figure 5:
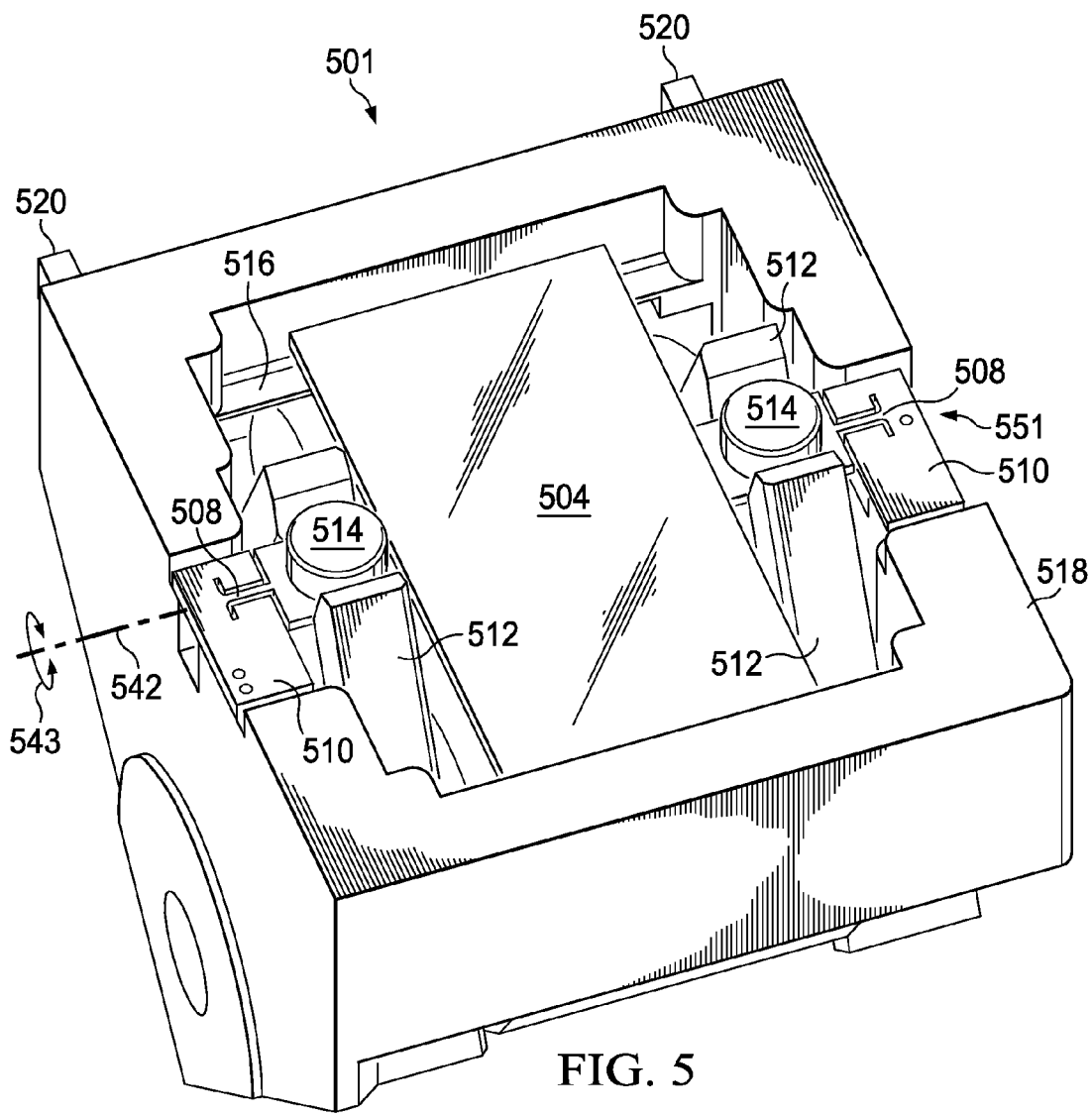
FIG. 5 is a MEMS mirror assembly with a recessed mirror, in accordance with an illustrative embodiment.

FIG. 5 shows an illustrative embodiment of a MEMS mirror assembly with a recessed mirror. MEMS mirror assembly 501 includes mirror subassembly 551, such as mirror subassembly 470, in FIG. 4D. Mirror subassembly 551 includes recessed mirror 504, torsional hinges 508, hinge anchors 510, and drive magnets 514. MEMS mirror assembly 501 further comprises a core, of which only core tips 512 are shown, mirror stop 516, package bracket 518, and terminals 520. The package bracket 518 may be any appropriate type of casing. Thus, connecting terminals 520 to an alternating current, mirror 504 can be made to oscillate at that frequency by energizing the coil with alternating positive and negative voltage at a selected frequency.

The mirror mechanical motion is about hinge axis 542 as shown by arcuate arrow 543. Mirror 504 pivots about hinge axis 542 using an electromagnetic drive as shown in this embodiment. In an embodiment, MEMS mirror assembly 501 may be used in applications for which high speed oscillation at a resonant frequency is not preferred. Rather MEMS mirror assembly 501 may be used in an application wherein a saw tooth pattern (fly-back) or a sinusoidal pattern is appropriate. Further, MEMS mirror assembly 501 may be required to move relatively less often and maintain an accurate and continuous position over time.

As mentioned above, to facilitate the electromagnetic drive, MEMS mirror assembly 501 may also include a first and second pair of magnets 514 mounted on mirror subassembly 551, along hinge axis 542. Magnets 514 may symmetrically distribute mass about the hinge axis 542 to minimize oscillation under shock and vibration. Further, the symmetrical distributing of magnets 514 may promote a balanced mirror subassembly 551.

Although the illustrative embodiment and its advantages have been described in detail, it should be understood that various changes, substitutions, and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that mirror shapes and drive mechanisms may be varied while remaining within the scope of the present invention.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A MEMS device comprising:
   a mirror formed from a first substrate;
   a hinge/support structure formed from a second substrate, wherein the hinge/support structure includes a recess and a torsional hinge region, and wherein the mirror is coupled onto the hinge/support structure in the recess; and
   a driver system employed to cause the mirror to pivot about the torsional hinge region;
   wherein the torsional hinge region of the hinge/support structure has a first thickness $t_1$, the recess has a second thickness $t_2$, and the mirror has a third thickness $t_3$, and wherein $t_1$ is greater than a sum of $t_2$ and $t_3$.

2. The MEMS device of claim 1, wherein $t_2$ is substantially equal to a difference between one half $t_1$ and one half $t_3$.

3. The MEMS device of claim 1, further comprising:
   an axis of rotation for the hinge/support structure; and
   a plurality of permanent magnets, wherein the plurality of permanent magnets are balanced about the axis of rotation.

4. The MEMS device of claim 1, wherein the torsional hinge region has a first density $d_1$, and the mirror has a second density $d_2$, and wherein $d_1$ and $d_2$ are substantially equal.

5. The MEMS device of claim 1, wherein the mirror has a width $W_1$, and the recess has a width $W_2$, and wherein $W_2$ is greater than $W_1$.

6. The MEMS device of claim 1, wherein the mirror has a length $L_1$, and the recess has a length $L_2$, and wherein $L_1$ is greater than $L_2$.

7. The MEMS device of claim 1, wherein the first substrate comprises silicon.

8. The MEMS device of claim 1, wherein the second substrate comprises single crystalline silicon.

9. The MEMS device of claim 1, wherein the driver system comprises an electromagnetic coil, and wherein the electromagnetic coil provides a torque to cause the mirror to pivot about the torsional hinge region.

10. The MEMS device of claim 1, wherein the second substrate includes semiconductor circuitry.

* * * * *